(12) United States Patent
Forster

(10) Patent No.: US 7,298,267 B2
(45) Date of Patent: Nov. 20, 2007

(54) RFID TEST INTERFACE SYSTEMS AND METHODS

(75) Inventor: Ian J. Forster, Chelmsford (GB)

(73) Assignee: Avery Dennison, Pasadena, CA (US)

( * ) Notice: Subject to any disclaimer, the term of this patent is extended or adjusted under 35 U.S.C. 154(b) by 230 days.

(21) Appl. No.: 11/126,113

(22) Filed: May 9, 2005

(65) Prior Publication Data

US 2006/0250246 A1 Nov. 9, 2006

(51) Int. Cl.
*G08B 13/14* (2006.01)

(52) U.S. Cl. .............................. 340/572.1; 340/572.4; 340/10.1

(58) Field of Classification Search ............. 340/572.1, 340/572.4, 10.1, 10.4, 10.41
See application file for complete search history.

(56) References Cited

U.S. PATENT DOCUMENTS

| | | | |
|---|---|---|---|
| 4,802,216 A | 1/1989 | Irwin et al. | |
| 5,235,326 A | 8/1993 | Beigel et al. | |
| 5,983,363 A | 11/1999 | Tuttle et al. | |
| 6,104,291 A | 8/2000 | Beauvillier et al. | |
| 6,219,543 B1 | 4/2001 | Myers et al. | |
| 6,236,223 B1 | 5/2001 | Brady et al. | |
| 6,246,326 B1 | 6/2001 | Wiklof et al. | |
| 6,288,629 B1 * | 9/2001 | Cofino et al. | 340/10.1 |
| 6,346,881 B1 | 2/2002 | Davidson | |
| 6,409,401 B1 | 6/2002 | Petteruti et al. | |
| 6,412,086 B1 | 6/2002 | Friedman et al. | |
| 6,445,297 B1 | 9/2002 | Nicholson | |
| 6,486,769 B1 | 11/2002 | McLean | |
| 6,487,681 B1 | 11/2002 | Tuttle et al. | |
| 6,545,605 B2 | 4/2003 | Van Horn et al. | |
| 6,593,853 B1 | 7/2003 | Barrett et al. | |
| 6,784,789 B2 | 8/2004 | Eroglu et al. | |
| 6,784,813 B2 * | 8/2004 | Shanks et al. | 340/572.1 |
| 6,806,812 B1 | 10/2004 | Cathey | |
| 7,132,946 B2 | 11/2006 | Waldner et al. | |
| 2001/0002106 A1 | 5/2001 | Tuttle et al. | |
| 2002/0167397 A1 | 11/2002 | Eroglu et al. | |
| 2002/0186004 A1 | 12/2002 | Prazeres da Costa | |
| 2004/0032443 A1 | 2/2004 | Moylan et al. | |
| 2004/0075607 A1 | 4/2004 | Cathey | |
| 2004/0178267 A1 | 9/2004 | Tsirline et al. | |
| 2004/0215350 A1 | 10/2004 | Roesner | |
| 2005/0045723 A1 | 3/2005 | Tsirline et al. | |
| 2005/0045724 A1 | 3/2005 | Tsirline et al. | |
| 2005/0068179 A1 | 3/2005 | Roenser | |

(Continued)

FOREIGN PATENT DOCUMENTS

JP 2003/076946 3/2003

(Continued)

*Primary Examiner*—John Tweel, Jr.
(74) *Attorney, Agent, or Firm*—MacPherson Kwok Chen & Heid LLP; Greg J. Michelson

(57) ABSTRACT

Systems and methods are disclosed herein to provide RFID communication and testing techniques. For example, in accordance with an embodiment of the present invention, an RFID system includes a radio frequency source adapted to provide radio frequency energy to an RFID device, a short-range coupler adapted to couple with the RFID device, at least one diode coupled to the short-range coupler, and an interface. The interface is coupled to the diodes and adapted to provide via the short-range coupler and the diodes modulation of the radio frequency energy to the RFID device and detection of a signal provided by the RFID device.

25 Claims, 4 Drawing Sheets

U.S. PATENT DOCUMENTS

| | | |
|---|---|---|
| 2005/0150102 A1 | 7/2005 | Bosco et al. |
| 2006/0012387 A1 | 1/2006 | Shanks |
| 2006/0208895 A1 | 9/2006 | Chiu |

FOREIGN PATENT DOCUMENTS

| | | |
|---|---|---|
| JP | 2003/076947 | 3/2003 |
| JP | 2003/099719 | 4/2003 |
| JP | 2003/099720 | 4/2003 |
| JP | 2003/099721 | 4/2003 |
| JP | 2003/168082 | 6/2003 |
| JP | 2003/168098 | 6/2003 |
| JP | 2003/187213 | 7/2003 |
| JP | 2003/331220 | 11/2003 |
| WO | WO 2000/028339 | 5/2000 |
| WO | WO 2001/065517 | 9/2001 |
| WO | WO 2002/014884 | 2/2002 |
| WO | WO 2002/088762 | 11/2002 |
| WO | WO 2004/084119 | 9/2004 |
| WO | WO 2004/088571 | 10/2004 |
| WO | WO 2004/095350 | 11/2004 |

* cited by examiner

RFID TEST INTERFACE SYSTEMS AND METHODS

TECHNICAL FIELD

The present invention relates generally to radio frequency identification (RFID) applications and, more particularly, to RFID device testing and communication techniques.

BACKGROUND

Radio frequency identification (RFID) devices are known and typically utilized to associate information with an object (e.g., a retail product). One challenge associated with RFID devices (e.g., RFID tags, RFID labels, RFID chips, RFID straps, or RFID inlays) is the manufacture and testing of the RFID devices in a cost-efficient manner.

For example, a conventional method of testing RFID devices during the manufacturing process involves bi-directional communication with each of the RFID devices at one or more defined frequencies and radio frequency power levels. However, the conventional bi-directional communication typically employs a specialized RFID reader that is expensive and may not be optimized for rapid testing.

Furthermore, because the RFID reader is expensive, the number of RFID readers is typically limited and utilized sparingly to serially test the RFID devices, with each of the RFID devices sequentially positioned into test position or the RFID reader sequentially moved from one RFID device to the next in a designated test area. Thus, the testing process may be limited in terms of the number of RFID devices that can be tested in a cost effective manner.

Additionally, any device that incorporates an RFID reader, such as for example a printer that prints on RFID labels, may have a significant increase in price due to the cost of the RFID reader. Consequently, conventional RFID communication techniques may be limited in terms of cost and/or in the number of RFID devices that can be tested. As a result, there is a need for improved communication techniques for RFID devices.

SUMMARY

Systems and methods are disclosed herein to provide RFID communication and testing techniques. For example, in accordance with an embodiment of the present invention, an RFID communication system includes a radio frequency (RF) source providing un-modulated RF energy to an RFID device and a communication device for providing modulation and communication with the RFID device. The communication device, for example, may represent a controller providing a digital interface for performing the modulation and other communication functions. Consequently, in accordance with an embodiment of the present invention, the RFID communication system may communicate with one or more RFID devices in a simple and cost-effective manner relative to other conventional techniques.

More specifically, in accordance with one embodiment of the present invention, an RFID system includes a radio frequency source adapted to provide radio frequency energy to an RFID device; a short-range coupler adapted to couple with the RFID device; at least one diode coupled to the short-range coupler; and an interface, coupled to the at least one diode, adapted to provide via the short-range coupler and the at least one diode at least one of a modulation of the radio frequency energy to the RFID device and a detection of a signal provided by the RFID device.

In accordance with another embodiment of the present invention, an RFID communication system includes means for providing a radio frequency signal to a plurality of RFID devices; means for coupling to the plurality of RFID devices; and means for controlling voltage levels to provide via the coupling means a modulation of the radio frequency signal to the RFID devices.

In accordance with another embodiment of the present invention, a method of communicating with RFID devices includes providing a common radio frequency signal to the RFID devices; coupling in a near field region with the RFID devices; and interfacing with the RFID devices through the near field region coupling to modulate the common radio frequency signal to the RFID devices.

In accordance with another embodiment of the present invention, an RFID system includes a radio frequency source adapted to provide un-modulated radio frequency energy to one or more RFID devices; a short-range coupler adapted to couple with one of the RFID devices; and means for detecting via the short-range coupler information from the RFID device and for modulating via the short-range coupler the radio frequency energy provided to the RFID device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
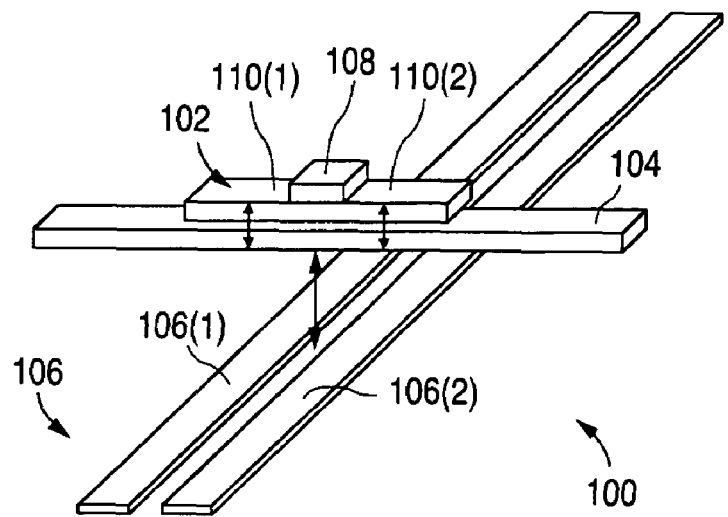
FIG. 1 shows a block diagram illustrating a radio frequency identification communication system in accordance with an embodiment of the present invention.

FIG. 1 shows a block diagram of a system 100, which illustrates a radio frequency identification (RFID) communication technique in accordance with an embodiment of the present invention. System 100 includes an RFID device 102, a coupler 104, and a transmission line 106.

RFID device 102 may represent any type of RFID device (e.g., an RFID tag, an RFID label, an RFID chip, an RFID strap, or an RFID inlay). For example, RFID device 102 may include an RFID chip 108 and an element 110 (e.g., labeled as elements 110(1) and 110(2)) which, depending upon the type of the RFID device, may represent an antenna or a strap/interposer or other conducting portion of RFID device 102.

Coupler 104 enables communication with RFID device 102, for example, via short-range coupling (e.g., near field coupling techniques) as would be understood by one skilled in the art. In general, an antenna of RFID device 102 may be viewed as having a near field region and a far field region. The near field region refers to a reactive near field (e.g., approximately $R \leq \lambda/2\Pi$) and a radiating near field (e.g., approximately $R<2D^2/\lambda$), while the far field region refers to a radiating far-field component (e.g., approximately $R>2D^2/\lambda$), where R is the distance from the antenna and D is the largest dimension of the antenna.

Due to the short-range coupling between coupler 104 and RFID device 102, only RFID device 102 typically responds to the communication (RF signal), while any other RFID devices in close proximity to RFID device 102 (e.g., such as other RFID devices on a sheet or a roll of a common carrier web) do not respond to the communication provided for RFID device 102. If a neighboring RFID device responds along with RFID device 102, RFID device 102 may be identified based upon its identification code or other data provided in its response.

Alternatively or in addition, coupler 104 may, for example, communicate to RFID device 102 through a gap in a metal shield through which the short-range coupling occurs, with the metal shield preventing the other RFID devices near RFID device 102 from receiving the RF signal provided to RFID device 102. Strips of metal to "short" the electric field, dielectric materials to de-tune or change the frequency, and high-permeability materials to interact magnetically and de-tune or change the frequency may also be employed, as would be understood by one skilled in the art.

Various conventional short-range coupling techniques are known and may be utilized to provide the RF signal via coupler 104 to RFID device 102, as would be known by one skilled in the art. Additionally, short-range coupling techniques via coupler 104 to RFID device 102 may be implemented as disclosed in U.S. patent application Ser. No. 10/367,515, filed Feb. 13, 2003, and entitled "RFID Device Tester and Method" and/or as disclosed in U.S. patent application Ser. No. 10/882,947, filed Jul. 1, 2004, and entitled "RFID Device Preparation System and Method," which are incorporated herein by reference in their entirety.

For example, coupler 104 may represent one or more pairs of couplers (e.g., coupler 104 or a number of couplers 104) to couple via an electric field with RFID device 102 (e.g., capacitively couple to element 110 of RFID device 102). Alternatively, or in addition, coupler 104 may represent a coil (e.g., single-turn coil or multi-turn coil) to couple via a magnetic field with RFID device 102 (e.g., inductively couple to element 110 of RFID device 102). Thus, coupler 104 may couple to RFID device 102 via an electric field, a magnetic field, or some combination of electric and magnetic fields (electromagnetic field), with coupler 104 providing the appropriate structure (e.g., parallel plates, single or multi-turn coils, transmission lines, or other types of structures). Furthermore, the signal frequency provided to RFID device 102 via coupler 104 and/or transmission line 106 may be at a frequency different from the natural resonant frequency of RFID device 102, as discussed further in U.S. patent application Ser. Nos. 10/367,515 and 10/882,947.

As another example, coupler 104 may provide short-range coupling by making a direct connection with one or more conducting contact points of RFID device 102, as would be understood by one skilled in the art. For example, coupler 104 may make a direct connection with the antenna, the strap, or chip pads of RFID device 102, depending upon the type of RFID device being utilized. Thus, coupler 104 may provide short-range coupling in the near field via electric and/or magnetic fields or by direct connection with RFID device 102.

Transmission line 106 (e.g., labeled as transmission line pair 106(1) and 106(2)) is employed to couple (e.g., via near field or far field techniques) un-modulated RF energy to RFID device 102. For example, an RF transmitter or other RF transmission source may be utilized to provide the un-modulated RF energy of a defined level via transmission line 106 (e.g., in the near field region) to RFID device 102. For example, the double-headed arrows in FIG. 1 illustrate the coupling or transfer of energy and/or information between transmission line 106 and RFID device 102 and between coupler 104 and RFID device 102.

Alternatively, another type of RF energy delivery method may be employed instead of transmission line 106 to deliver the un-modulated RF energy to one or more of RFID devices 102. For example, RFID device 102 may be illuminated with an antenna in the far field region to provide the un-modulated RF energy at a sufficient level for RFID device 102 to function properly.

A communication device (not shown) may communicate with RFID device 102 via coupler 104. For example, the communication device may communicate via coupler 104 with RFID device 102 by modulating the un-modulated RF energy provided (e.g., via transmission line 106) and receive (e.g., detect) the response, if any, provided by RFID device 102. As an example, the communication device may provide an amplitude modulated data sequence via coupler 104 to the RF energy provided to RFID device 102 to communicate (e.g., provide commands) to RFID device 102.

Figure 2:
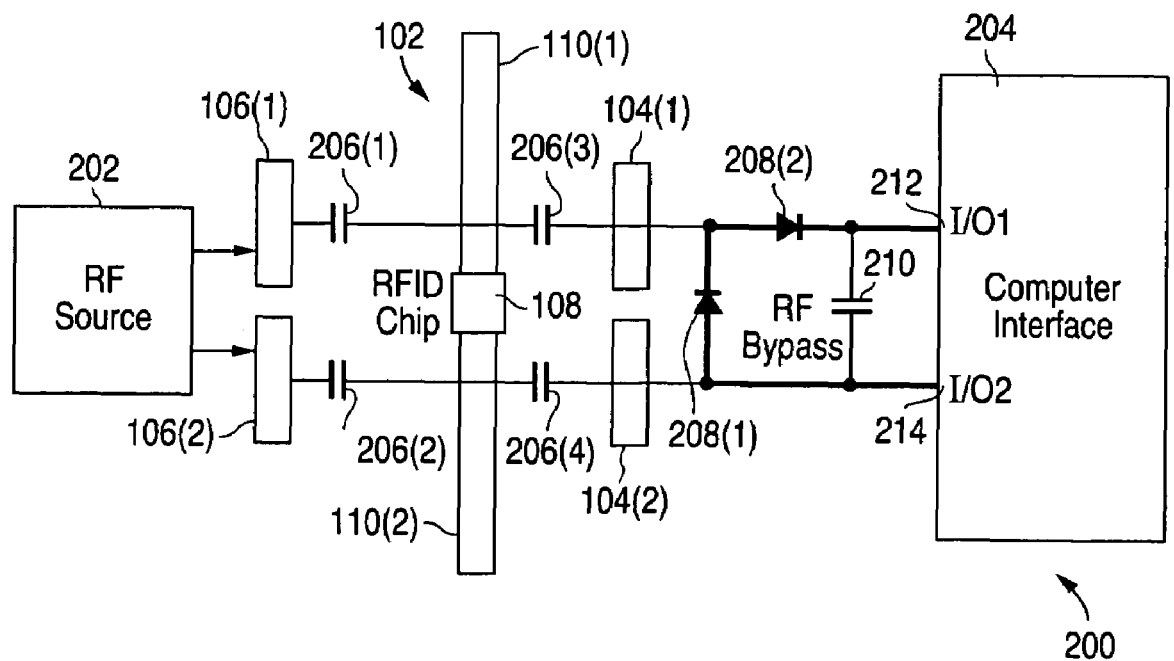
FIG. 2 shows a block diagram illustrating a radio frequency identification communication system in accordance with an embodiment of the present invention.

For example, FIG. 2 shows a block diagram of a system 200, which illustrates an exemplary implementation of an RFID communication system in accordance with an embodiment of the present invention. System 200 includes RFID device 102, coupler 104, transmission line 106, an RF source 202, a controller 204, and diodes 208.

Capacitors 206 (i.e., capacitors 206(1) through 206(4) shown in FIG. 2) are shown to illustrate an exemplary capacitive coupling affect between transmission line 106 and RFID device 102 and between coupler 104 and RFID device 102. Thus, capacitors 206 are only representative of the capacitive nature of this exemplary implementation and actual physical capacitors would typically not be present.

RF source 202 (e.g., an RF transmitter or other known source of RF energy) provides the un-modulated RF energy via transmission line 106 to RFID device 102. Controller 204 may be implemented as an application specific integrated circuit, a programmable logic device, a computer (e.g., a processor-based system), a microprocessor (e.g., one-time programmable microprocessor), a microcontroller or any other type of circuit or system, which can provide an interface (e.g., a digital or computer interface) and/or one or more functions (e.g., modulation and/or detection) as described further herein.

Alternatively, controller 204 may represent an interface (e.g., a digital or computer interface) that is controlled by an appropriate device (e.g., a computer or other device as described similarly for controller 204 herein). Consequently, for example, a number of interfaces may be implemented and controlled by a single device to communicate simultaneously or selectively with a number of RFID devices 102. Thus, the RFID devices 102 may be provided with RF energy by RF source 202, with the RFID devices 102 communicating with corresponding controllers 204 (e.g., interfaces) that are linked to the single device (e.g., as described further in reference to FIG. 3).

Controller 204 communicates with RFID device 102 via coupler 104 and employs diodes 208, which are separately referenced as diodes 208(1) and 208(2), to perform various functions. For example, by having controller 204 determine a voltage level on one or more of its input/output ports 212, 214 (labeled I/O 1 and I/O 2, respectively), controller 204 may modulate the un-modulated RF energy provided by RF source 202 or detect a signal provided by RFID device 102. A capacitor 210 may optionally be coupled across I/O ports 212, 214 of controller 204 as shown in FIG. 2 (e.g., to reduce noise).

As an example, controller 204 may control voltage levels on I/O ports 212, 214 to drive a current through diodes 208, which reduces their impedance (e.g., close to a short circuit at RF frequencies). Because controller 204 is closely coupled to RFID device 102 via coupler 104 and when the impedance of diodes 208 is reduced, the amplitude of the un-modulated RF energy provided by RF source 202 to RFID device 102 is reduced. Therefore, if a data sequence is provided (e.g., a command) by controller 204 to RFID device 102 by varying the voltage level at I/O port 212 and/or I/O port 214, then RFID device 102 may be provided with an amplitude modulated RF signal, even though controller 204 has only provided a relatively low frequency data signal.

As a specific implementation example, RF source 202 provides a continuous RF signal via transmission line 106 to RFID device 102. Controller 204 modulates the RF signal received by RF device 102 (from RF source 202) with a data sequence by setting I/O port 212 to a logical low (i.e., a "0" or low voltage level) and switching I/O port 214 between the logical low and a logical high (i.e., a "1" or a high voltage level) as appropriate for the desired data sequence (i.e., command). Thus, the RF signal provided to RFID device 102 via coupling is modulated by controlling the state of diodes 208 (e.g., alternately driving current through diodes 208 to provide a low RF impedance, which reduces via coupling the RF signal provided to RFID device 102).

As another example, controller 204 may control voltage levels on I/O ports 212, 214 and employ diodes 208 to detect the response from RFID device 102. For example, controller 204 via diodes 208 and coupler 104 detects the RF signal coupled via RFID device 102 from RF source 202 via transmission line 106. When RFID device 102 modulates its impedance (e.g., by shorting a transistor across an RF input) to transmit a signal, such as in response to a command, the change in the coupled power and the detected voltage is sensed by controller 204.

As a specific implementation example, RF source 202 provides a continuous RF signal via transmission line 106 to RFID device 102. Controller 204 detects the modulation provided by RFID device 102 (e.g., in response to a command as described above) by setting I/O port 212 to a logical low and setting I/O port 214 as an input port to monitor its state. For example, when the input impedance of RFID device 102 is in its normal state, a high voltage will be detected at I/O port 214. When RFID device 102 changes from its normal state (e.g., by shorting the RF input of its antenna), a low voltage will be detected at I/O port 214 by controller 204. Thus, information (e.g., a response) provided by RFID device 102 may be received (e.g., detected) by controller 204.

In general, in accordance with one or more embodiments of the present invention, a test interface for one or more RFID devices is disclosed. For example, the test interface technique provides a method of interfacing with one or more RFID devices, without the need to generate a separate RF signal to communicate with each RFID device. The test interface technique may be applied to assembly line testing, to high-speed RFID device testing during the manufacturing process, and may be implemented in various devices (e.g., a printer for RFID labels) that may need to communicate with the RFID devices.

For example, in accordance with an embodiment of the present invention, a method is disclosed of communicating with RFID devices that receive an un-modulated RF signal from a common source. A controller (e.g., a microcontroller) drives one or more diodes linked to a coupler to module the un-modulated RF signal and detect the modulation from the RFID device. The RF signal may be provided from a common RF source, such as a transmission line or a far field antenna, with the controllers (or interfaces controlled by the controller) placed at intervals (depending upon the application or requirements) to communicate with the corresponding RFID devices.

By separating the RF source for the RFID devices from the interface that modulates the RF energy to send commands and that detects the RFID device's response, a simple, low-cost module may be provided to facilitate communication with the RFID devices. The modules may be provided for parallel testing of a large number of RFID devices at high speed. Furthermore, the systems and methods disclosed may provide isolation between the RFID devices, because the RFID devices adjacent to the RFID device being tested may be saturated with RF energy and unable to detect the amplitude modulation imposed on the RFID device under test.

Figure 3:
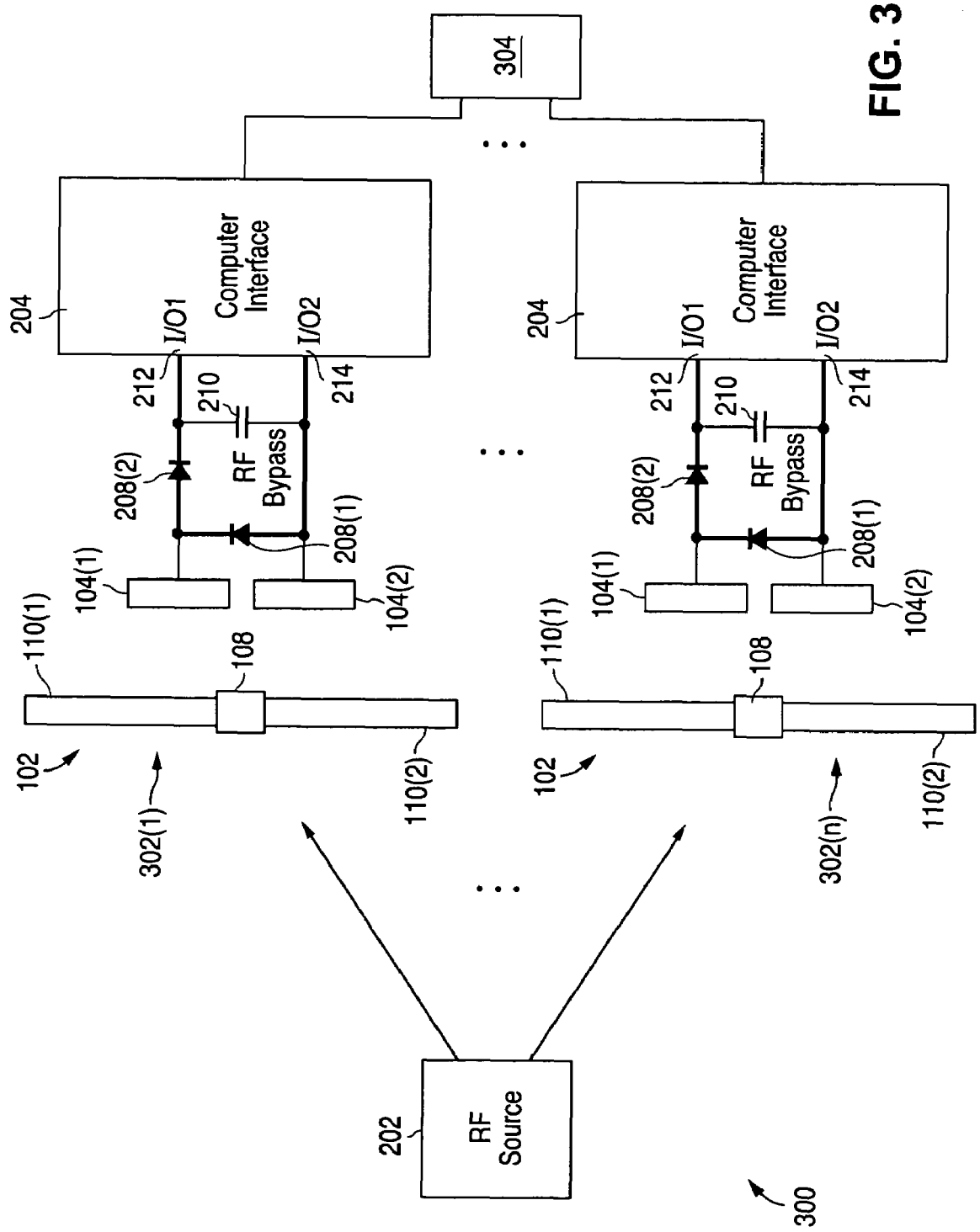
FIG. 3 shows a block diagram illustrating a radio frequency identification communication system in accordance with an embodiment of the present invention.

For example, FIG. 3 shows a block diagram of a system 300, which illustrates an exemplary implementation of an RFID communication system in accordance with an embodiment of the present invention. System 300 includes RF source 202, which is a common source for providing un-modulated RF energy (e.g., via transmission lines 106, not shown, or via a far field antenna) to a number of communication stations 302.

Communication stations 302 (separately referenced as communication stations 302(1) through 302(n), where "n" represents the total number of communication stations 302) may each include controller 204, diodes 208, and coupler 104 for communicating with corresponding RFID devices 102. Communication stations 302, for example, may be implemented as a test system for RFID devices 102, such as during the manufacturing process or to add functionality to a device (e.g., a printer configured to print RFID labels and/or communicate with RFID devices).

Each controller 204 may communicate with the corresponding RFID device 102, as described herein. For example, controllers 204 may independently communicate with corresponding RFID devices 102 or, optionally a device 304 may be provided to couple to controllers 204 to control the communication. Device 304, for example, may be implemented as an application specific integrated circuit, a programmable logic device, a computer (e.g., a processor-based system), a microprocessor (e.g., one-time programmable microprocessor), a microcontroller, or any other type of circuit or system to control controller 204.

As discussed herein, RF source 202 may provide the un-modulated RF energy via a far field antenna or via transmission lines 106. Furthermore, transmission lines 106 may provide the RF energy generally to one or more RFID devices 102 (e.g., as shown in FIG. 1) or in a more individual fashion using short-range coupling techniques.

Figure 4:
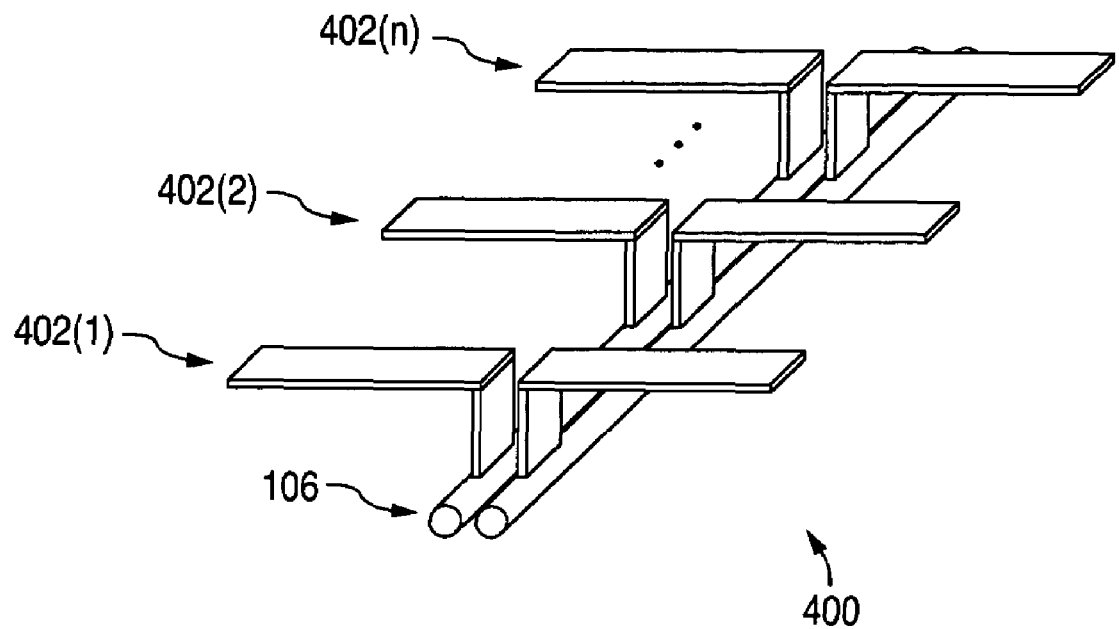
FIG. 4 shows a block diagram illustrating a radio frequency identification communication system technique in accordance with an embodiment of the present invention.

For example, FIG. 4 shows a block diagram illustrating a system 400 for an RFID communication system in accordance with an embodiment of the present invention. System 400 includes transmission line 106 and couplers 402 (which are separately referenced as couplers 402(1) through 402(n), where "n" is the desired number of couplers 402). Transmission line 106 may represent any type of transmission path (e.g., a twin line, a coaxial line, a microstrip, or any other desired form of wired transmission path for carrying RF signals to couplers 402).

Couplers 402 may represent individual electric, magnetic, or electric and magnetic coupling devices or a direct connection coupler, such as those described for example in reference to couplers 104 (FIGS. 1-3). Thus, couplers 402(1) through 402(n) may be implemented to provide un-modulated RF energy from RF source 202 via transmission line 106 to corresponding RFID devices 102 (i.e., RFID devices 102(1) through 102(n)). For example, system 400 may be implemented within system 300 (FIG. 3) to provide the un-modulated RF energy from RF source 202 to RFID devices 102 within communication stations 302(1) through 302(n) via transmission line 106 and corresponding couplers 402(1) through 402(n).

Figure 5:
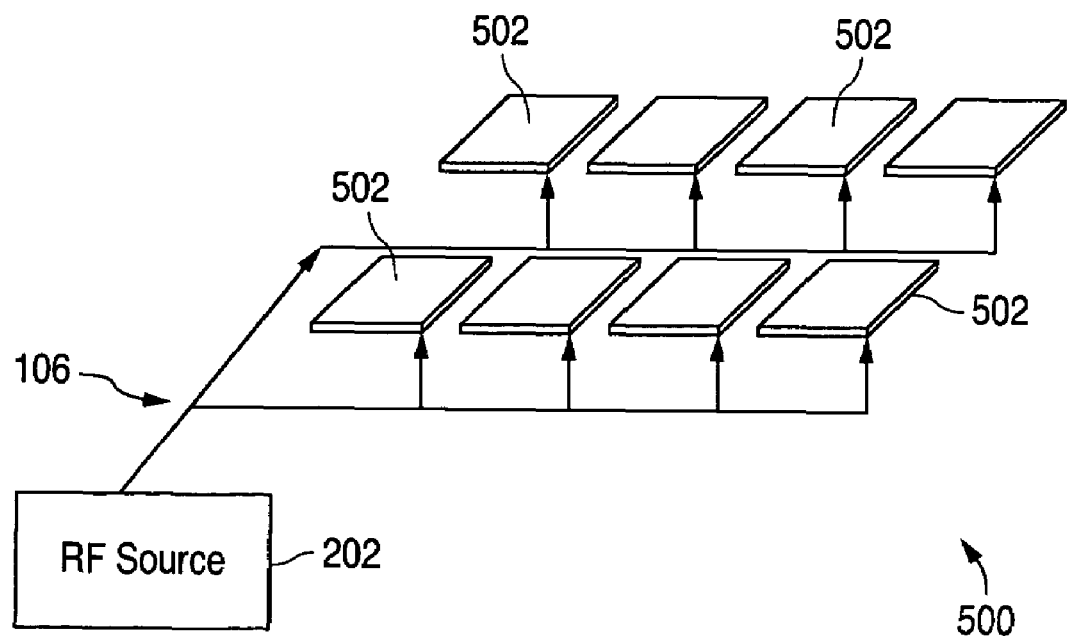
FIG. 5 shows a block diagram illustrating a radio frequency identification communication system technique in accordance with an embodiment of the present invention.

Couplers 402 and transmission line 106 may be configured in any desired configuration and may be implemented as desired depending upon the type of application. For example, FIG. 5 shows a block diagram of a system 500 for an RFID communication system in accordance with an embodiment of the present invention. System 500 includes RF source 202, transmission line 106, and couplers 502. RF source 202 provides a common RF signal (e.g., 125 kHz or 13.56 MHz) to couplers 502 via transmission line 106.

Couplers 502 are configured in an exemplary sized array configuration, with each coupler 502 capable of providing short-range coupling to a corresponding RFID device 102. Couplers 502, for example, may represent a specific exemplary implementation of couplers 402, with couplers 502 providing an array of individual coupling coils designed to couple with corresponding RFID devices 102 (e.g., low frequency RFID tag devices).

It may be difficult to keep the loading on transmission line 106 constant and avoid reflections, depending upon the system requirements or desired application, when the short-range couplers (e.g., couplers 402 of FIG. 4 or couplers 502 of FIG. 5) are driven by the common RF source 202. One technique, in accordance with an embodiment of the present invention, is to employ an amplifier (e.g., a high input impedance amplifier) for one or more couplers 402 (FIG. 4) or couplers 502 (FIG. 5).

Figure 6:
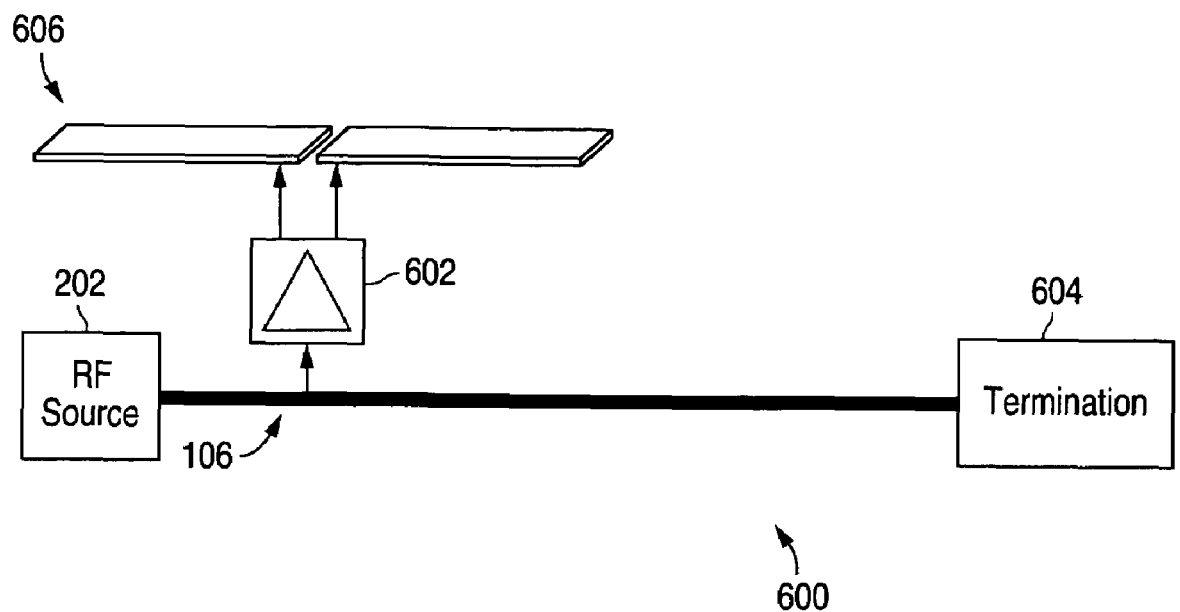
FIG. 6 shows a block diagram illustrating a radio frequency identification communication system technique in accordance with an embodiment of the present invention.

For example, FIG. 6 shows a block diagram illustrating a system 600 for an RFID communication system in accordance with an embodiment of the present invention. System 600 includes RF source 202, transmission line 106, an amplifier 602, and a coupler 606. Coupler 606 may represent coupler 402 (FIG. 4) or coupler 502 (FIG. 5) and employ amplifier 602 to take the RF signal from transmission line 106 (e.g., tap into the RF signal distribution source) and drive the RF signal to coupler 606.

Amplifier 602, for example, may represent a high input impedance amplifier having a gain that is adjustable to provide the desired signal level to coupler 606. Consequently, by using amplifier 602, the propagation of the RF signal in transmission line 106 between RF source 202 and a termination point 604 (optional) may be less affected by the number of couplers 606.

For example, amplifier 602 may be provided between transmission line 106 (e.g. a coaxial cable) and each corresponding coupler 606 to tap off the RF signal, while generally avoiding disturbing the Rf signal on transmission line 106. Thus, unwanted reflections of the RF signal on transmission line 106 may be reduced and amplifier 602 may be utilized to adjust the signal level to corresponding coupler 606, which may be required, as the RF signal tends to attenuate with distance along transmission line 106.

Figure 7:
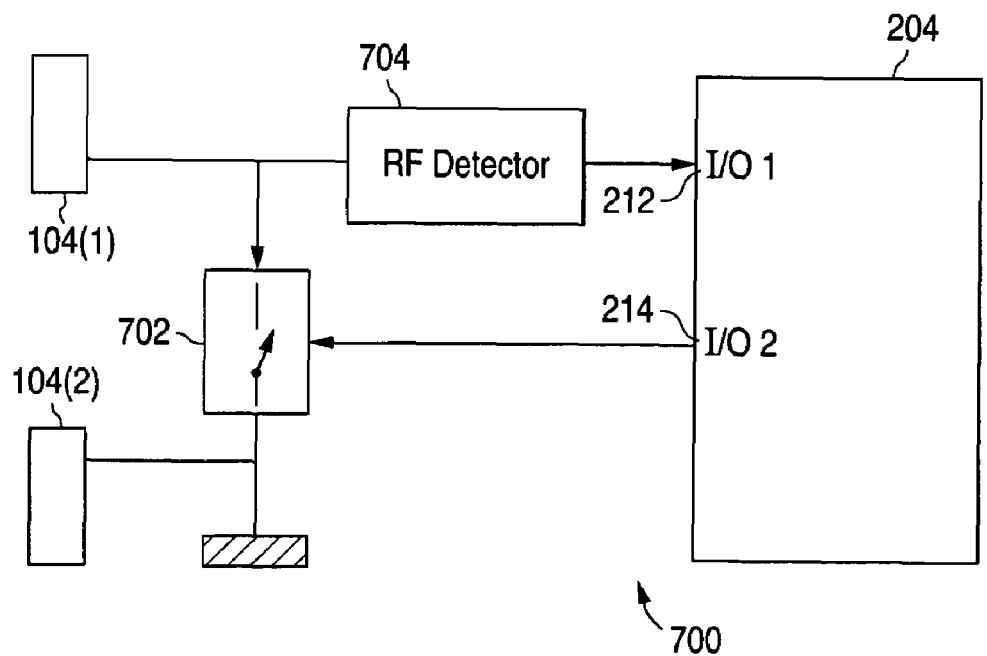
FIG. 7 shows a block diagram illustrating a radio frequency identification communication system technique in accordance with an embodiment of the present invention.

As discussed herein (e.g., in reference to FIG. 2), controller 204 and diodes 208 may be employed to communicate with RFID device 102. As an alternative implementation, in accordance with an embodiment of the present invention, FIG. 7 shows a block diagram illustrating a system 700 for an RFID communication system in accordance with an embodiment of the present invention. System 700 provides a coupling interface to modulate the RF signal provided by RF source 202 to RFID device 102 (not shown) and detect the changes caused by RFID device 102 modulating its impedance when it replies.

System 700 includes coupler 104 (e.g., couplers 104(1) and 104(2)), controller 204, a switch 702, and an RF detector 704. I/O port 214 controls switch 702 (e.g., an RF switch such as a shunt transistor or a high frequency analog switch integrated circuit) to modulate the RF signal provided to RFID device 102, for example, via RF source 202 and transmission line 106 (as described similarly in reference to FIG. 2). Switch 702 is coupled between coupler 104(1) and 104(2) as shown and coupled, for example, to a reference voltage (e.g., ground).

RF detector 704 is employed to detect any response provided by RFID device 102 and provide this information to I/O port 212. RF detector 704, for example, may be implemented as any type of conventional RF detector (e.g., a diode-based detector or an integrated circuit RF detector), as would be understood by one skilled in the art. In general, RF detector 704 provides a baseband voltage, which represents the amplitude of the RF signal rectified and integrated over time to remove voltage changes at the RF frequency and recover voltage changes due to the baseband signal modulation, as would be understood by one skilled in the art. The baseband voltage, for example, may be further provided to a voltage comparator circuit (e.g., via a series capacitor), which will provide a digital signal representing changes in the baseband signal. The voltage comparator circuit, for example if implemented, may be incorporated within RF detector 704 or within controller 204.

Thus, diodes 208 and capacitor 210 (if present) of FIG. 2 may be replaced by switch 702 and RF detector 704 to provide a short-range coupling interface (e.g., a near field coupling interface). Switch 702, controlled by controller 204, provides a variable impedance, which induces an amplitude modulation of the RF signal received by RFID device 102 from RF source 202, as described similarly in reference to FIG. 2. RF detector 704 provides a detector function to detect changes in the RF signal due to RFID device 102 modulating its RF impedance (e.g., when RFID device 102 responds to a command message).

Embodiments described above illustrate but do not limit the invention. It should also be understood that numerous modifications and variations are possible in accordance with the principles of the present invention. Accordingly, the scope of the invention is defined only by the following claims.

I claim:

1. A radio frequency identification (RFID) system comprising:
a radio frequency source adapted to provide radio frequency energy to an RFID device;
a short-range coupler adapted to couple with the RFID device, wherein the radio frequency energy from the radio frequency source is not provided via the short-range coupler;
at least one diode coupled to the short-range coupler; and
an interface, coupled to the at least one diode, adapted to provide via the short-range coupler and the at least one diode at least one of a modulation of the radio frequency energy to the RFID device and a detection of a signal provided by the RFID device.

2. The radio frequency identification system of claim 1, further comprising a controller, coupled to the interface, adapted to control input/output ports of the interface to provide the modulation of the radio frequency energy and the detection of the signal provided by the RFID device.

3. The radio frequency identification system of claim 1, wherein the radio frequency source further comprises at least one of a transmission line and an antenna.

4. The radio frequency identification system of claim 1, wherein the short-range coupler couples to the RFID device by at least one of an electric field, a magnetic field, and a direct connection.

5. The radio frequency identification system of claim 1, further comprising:
a plurality of short-range couplers adapted to couple with corresponding ones of the RFID devices;
a plurality of diodes coupled to corresponding ones of the short-range couplers;
a plurality of interfaces coupled to the corresponding ones of the diodes; and
a controller, coupled to the plurality of interfaces, adapted to control the interfaces to provide at least one of the modulation of the radio frequency energy and the detection of the signal provided by the RFID device, wherein the radio frequency source provides the radio frequency energy to the plurality of the RFID devices.

6. The radio frequency identification system of claim 1, wherein the RFID device comprises at least one of an RFID tag, an RFID label, an RFID chip, an RFID strap, and an RFID inlay.

7. The radio frequency identification system of claim 1, wherein voltage levels provided by the interface to the at least one diode provides the modulation via the short-range coupler of the radio frequency energy to the RFID device.

8. The radio frequency identification system of claim 1, wherein voltage levels provided by the interface to the at least one diode provides the detection of the signal from the RFID device via the short-range coupler.

9. The radio frequency identification system of claim 1, wherein the at least one diode comprises a first and a second diode, with the first diode coupled to a first port of the interface and to the second diode, and the second diode coupled to a second port of the interface.

10. The radio frequency identification system of claim 9, wherein the modulation is provided by setting the second port to a first voltage level and switching between a second voltage level and a third voltage level on the first port, and wherein the detection is provided by setting the second port to the first voltage level and monitoring voltage levels on the first port.

11. A radio frequency identification (RFID) communication system comprising:
means for providing a radio frequency signal to a plurality of RFID devices;
means for coupling to the plurality of RFID devices; and
means for controlling voltage levels to provide via the coupling means a modulation of the radio frequency signal to the RFID devices, wherein the controlling means provides a low frequency data signal to provide the modulation.

12. The radio frequency identification system of claim 11, wherein the radio frequency signal is a common signal provided to the RFID devices from the radio frequency signal providing means.

13. The radio frequency identification system of claim 11, wherein the coupling means couples to the RFID devices by at least one of an electric field, a magnetic field, and a direct connection.

14. The radio frequency identification system of claim 11, further comprising means for monitoring voltage levels to detect via the coupling means signals provided by the RFID devices.

15. The radio frequency identification system of claim 11, wherein the coupling means is separate from the providing means which is a common source of the radio frequency signal for the RFID devices.

16. The radio frequency identification system of claim 11, wherein the system is formed as part of at least one of a printer and a manufacturing test system.

17. A method of communicating with radio frequency identification (RFID) devices, the method comprising:
providing a common radio frequency signal to the RFID devices;
coupling in a near field region with the RFID devices; and
interfacing with the RFID devices through the near field region coupling to modulate the common radio frequency signal to the RFID devices, wherein a low frequency data signal is provided to modulate the common radio frequency signal to the RFID devices.

18. The method of claim 17, further comprising interfacing with the RFID devices through the near field region coupling to detect signals provided by the RFID devices.

19. The method of claim 17, wherein the coupling is by at least one of an electric field, a magnetic field, and a direct connection.

20. The method of claim 17, wherein the near field region coupling for the interfacing does not provide the common radio frequency signal of the providing, and wherein the interfacing sets a first voltage level at a second port and switches between a second voltage level and a third voltage level on a first port corresponding to each of the RFID devices to modulate the common radio frequency signal, and wherein the interfacing further comprises detecting a signal provided by each of the RFID devices by setting the second port to the first voltage level and monitoring voltage levels on the first port.

21. A radio frequency identification (RFID) system comprising:
a radio frequency source adapted to provide un-modulated radio frequency energy to one or more RFID devices;

a short-range coupler adapted to couple with one of the RFID devices, wherein the un-modulated radio frequency energy is not provided via the short-range coupler; and means for detecting via the short-range coupler information from the RFID device and for modulating via the short-range coupler the radio frequency energy provided to the RFID device.

22. The RFID system of claim 21, wherein the radio frequency source comprises a transmission line and a plurality of short-range radio frequency couplers to provide the un-modulated radio frequency energy to the RFID devices.

23. The RFID system of claim 22, wherein the radio frequency source further comprises a plurality of amplifiers corresponding to the plurality of short-range couplers.

24. The RFID system of claim 21, wherein the detecting means comprises an RF detector and the modulating means comprises a switch and a controller.

25. The RFID system of claim 21, wherein the detecting means and the modulating means comprises a controller and at least one diode.

* * * * *